United States Patent [19]

Ozeki

[11] Patent Number: 4,563,067
[45] Date of Patent: Jan. 7, 1986

[54] COOLING DEVICE FOR OVERHEAD TYPE SLIDE PROJECTORS

[75] Inventor: Jiro Ozeki, Tokyo, Japan
[73] Assignee: Slidex Corporation, Tokyo, Japan
[21] Appl. No.: 515,164
[22] Filed: Jul. 19, 1983

[30] Foreign Application Priority Data

Mar. 31, 1983 [JP] Japan .................... 58-53732

[51] Int. Cl.[4] .............................................. G03B 21/16
[52] U.S. Cl. .............................................. 353/60
[58] Field of Search .................... 353/52, 56–58, 353/60, 61, DIG. 3, DIG. 4, 120, 122, 25, 27 R, 27 A

[56] References Cited

U.S. PATENT DOCUMENTS

| | | | |
|---|---|---|---|
| 2,837,965 | 6/1958 | Goldsmith | 353/52 X |
| 3,338,132 | 8/1967 | Ruhle et al. | 353/61 X |
| 3,632,198 | 1/1972 | Puffer | 353/60 |
| 3,748,033 | 7/1973 | Harvey | 353/60 |

FOREIGN PATENT DOCUMENTS

| | | | |
|---|---|---|---|
| 1181717 | 1/1959 | France | 353/60 |
| 1174 | 1/1979 | Japan . | |
| 47731 | 2/1980 | Japan . | |

*Primary Examiner*—Harry N. Haroian
*Attorney, Agent, or Firm*—Fleit, Jacobson, Cohn & Price

[57] ABSTRACT

The disclosed cooling device, which is for overhead projectors adapted to project pictures of transparencies carried by a filing sheet without removing them from the filing sheet, comprises a blowing fan and an air-blowing nozzle adapted to discharge at least a part of the air from the blowing fan toward a space between a transparency in position for projection and bottom wall of the filing sheet, so as to cool the transparency and the filing sheet.

8 Claims, 6 Drawing Figures

COOLING DEVICE FOR OVERHEAD TYPE SLIDE PROJECTORS

BACKGROUND OF THE INVENTION

1. Field of the Invention

This invention relates to a cooling device for overhead type slide projectors, and more particularly to a cooling device which can cool transparencies being projected by overhead type slide projectors.

2. Description of the Prior Art

In the case of the so-called horizontal type slide projectors having condenser lenses and light-source lamps disposed on one level with a horizontal spacing therebetween, it has been a general practice to dispose a blowing fan on a plane where the lens system of the projector lies, so as to produce horizontal air flow for simultaneously cooling transparencies, condenser lenses, and the light-source lamp.

On the other hand, in the case of a widely used overhead type slide projector, a second condenser lens and transparencies are disposed above a translucent diffusing plate mounted on an upper portion of a framework of the projector. If such overhead type slide projector is cooled by the above-mentioned cooling device of the horizontal type slide projectors, the second condenser lens and the transparencies cannot be cooled suffficiently. Besides, when a halogen lamp is used as a light-source lamp, if the halogen lamp is cooled to the same level as that of the transparencies, the lamp may be cooled to a temperature below a desired point and the active halogen regenerating cycle may be hampered.

To solve the above-mentioned difficulties, the inventor disclosed in his Japanese Pat. No. 967883 a cooling device for overhead type slide projectors, which cooling device comprises a lens-holder member mounted on an upper portion of a lamp house so as to hold a second condenser lens at a level corresponding to the upper end of the lamp house, a translucent diffusing plate closing the top end of the projector framework, said lens-holder member having a top edge thereof extending upwards through said translucent diffusing plate so as to reach the proximity of that position where a transparency is to be held during projection, sucking holes formed between said lens-holder member and said second condenser lens, and a sucking fan disposed at one side of the lamp house in such a manner that the intake side of the sucking fan communicates with said sucking holes through the inside of said lamp house.

To facilitate storage of a number of transparencies in an orderly manner, the inventor has also disclosed a slide-filing sheet in his Japanese Pat. No. 1055825, which slide-filing sheet removably holds a plurality of transparencies, such as regular photographic slides for microscopic inspection, in a matrix arrangement in one plane. The disclosed slide-filing sheet holds the transparencies, such as those mounted on slide frames, parallel to but spaced from the bottom wall thereof. An air inlet opening and an air outlet opening are provided for each of the spaces between the transparencies and the bottom wall of the slide-filing sheet, so that air from the air inlet opening flows through both said space and said air outlet opening, so as to prevent the transparencies from being damaged by heating.

However, it is difficult to keep the transparencies carried by the slide-filing sheet at a temperature below about 60° C. during projection, even if the last-mentioned cooling device of the inventor is used. Thus, the prior art device for overhead type slide projectors has a shortcoming in that it cannot prevent discolouring and bending of transparencies after projection for a certain length of time.

SUMMARY OF THE INVENTION

Therefore, an object of the present invention is to obviate the above-mentioned shortcoming of the overhead type slide projector cooling device of the prior art by providing an improved cooling device.

Another object of the invention is to provide a cooling device which can keep transparencies and/or slide-filing sheets at a lower temperature than that attained by the prior art.

To fulfill the above-mentioned objects, a preferred embodiment of the cooling device for overhead type slide projectors of the present invention uses first air-blowing nozzles disposed on the outside surface of a cylindrical lensholder member, said first air-blowing nozzles being in communication with a blowing fan, so that the first air-blowing nozzle ejects air toward the lower surface of a transparency carried by a slide-filing sheet through an air inlet opening of the slide-filing sheet.

In another embodiment of the invention, a second air-blowing nozzle communicating with the blowing fan is disposed above a regular operating level of the slide-filing sheet in such a manner that the second air-blowing nozzle ejects air toward the upper surface of that transparency carried by the slide-filing sheet which is in position for projection.

BRIEF DESCRIPTION OF THE DRAWINGS

For a better understanding of the invention, reference is made to the accompanying drawings, in which.

Throughout different views of the drawings, 1 is a base, 2 is a lamp house, 3 is a stay, 4 is a filter, 5 is a first condenser lens, 6 is a light-source lamp, 7 is a light-source mirror, 8 is a reflector, 9 is a sucking pipe, 10 is a sucking fan, 11 is a cylindrical lens-holder member, 12 is a second condenser lens, 13 and 13' are connecting tubes, 14 is a blowing fan, 15 is a first air-blowing nozzle, 16 is a sucking hole, 17 is a translucent diffusing plate, 18 is a slide-filing sheet, 19 is an illuminating hole, 20 is a transparency, 21 is a seating portion, 22 is a bottom wall, 23 is a sidewall, 24 is an air inlet opening, 25 is an air outlet opening, and 26 is a second air-blowing nozzle.

DESCRIPTION OF THE PREFERRED EMBODIMENTS

Figure 1:
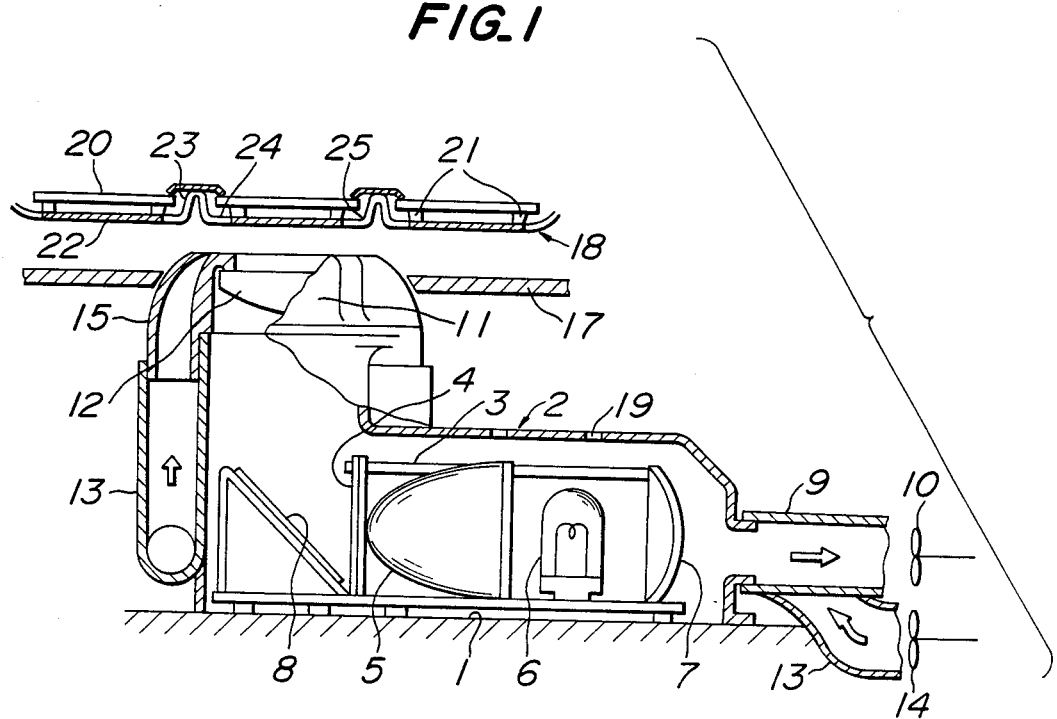
FIG. 1 is a partially cutaway schematic side view of a preferred embodiment of the cooling device according to the present invention.
Figure 2:
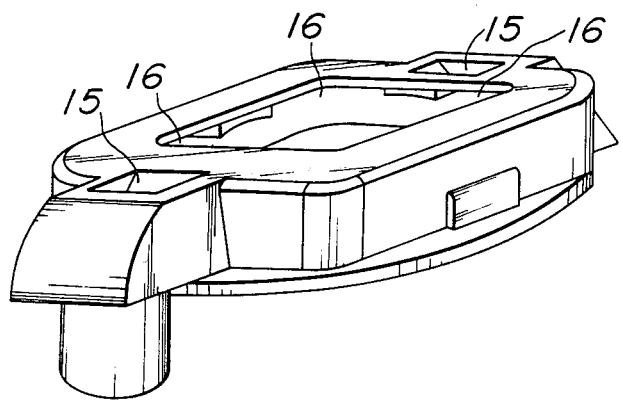
FIG. 2 is a schematic perspective view of a lensholder member to be used in the cooling device of the invention.

Referring to FIG. 1 showing an overhead type slide projector having a preferred embodiment of the cooling device according to the present invention, a base 1 of the overhead type slide projector has a cylindrical lamp house 2 fixed thereto. The wall of the lamp house 2 has a high heat conductivity. In the lamp house 2, spaced but parallel horizontal stays 3 hold a filter 4, a first condenser lens 5, a light-source lamp 6, a light-source mirror 7, and a reflector 8 for bending the horizontal luminous flux upward. A sucking pipe 9 is connected to one end of the lamp house 2, e.g., to the lower right end thereof in the illustrated embodiment, and a sucking fan 10 is coupled to the sucking pipe 9. A cylindrical lens-holder member 11, as shown in FIG. 2, is connected to an opening at the upper portion of the lamp house 2, e.g., at the upper left end thereof in the illustrated embodiment. The lens-holder member 11 of FIG. 2 has a substantially rectangular horizontal cross section, but the invention is not restricted to such horizontal cross-sectional shape. The lens-holder member 11 holds a circular second condenser lens 12 horizontally by grasping peripheral edge thereof. Connecting tubes 13 extending from a blowing fan 14 have first air-blowing nozzles 15 connected to upper ends thereof. In the illustrated embodiment, two first air-blowing nozzles 15 are integrally secured to the lens-holder member 11. Sucking holes 16 are provided at the upper portion of the lens-holder member 11, so as to allow the sucking fan 10 to suck air through both the sucking holes 16 and the inside of the lamp house 2.

The top end of the cylindrical lens-holding member 11 extends upward through a translucent diffusing plate 17 which is horizontally secured to the upper end of a framework of the overhead type slide projector. The position of the top end of the lens-holder member 11 is such that a slide-filing sheet 18 carried by a movable carriage (not shown) of the overhead type slide projector comes close to the top end of the lens-holder member 11. One or more illuminating holes 19 are bored through the top portion of the lamp house 2, so as to illuminate the translucent diffusing plate 17 by the luminous flux leaking through the illuminating holes 19 for facilitating inspection and selection of transparencies 20 carried by the slide-filing sheet 18.

Figure 3:
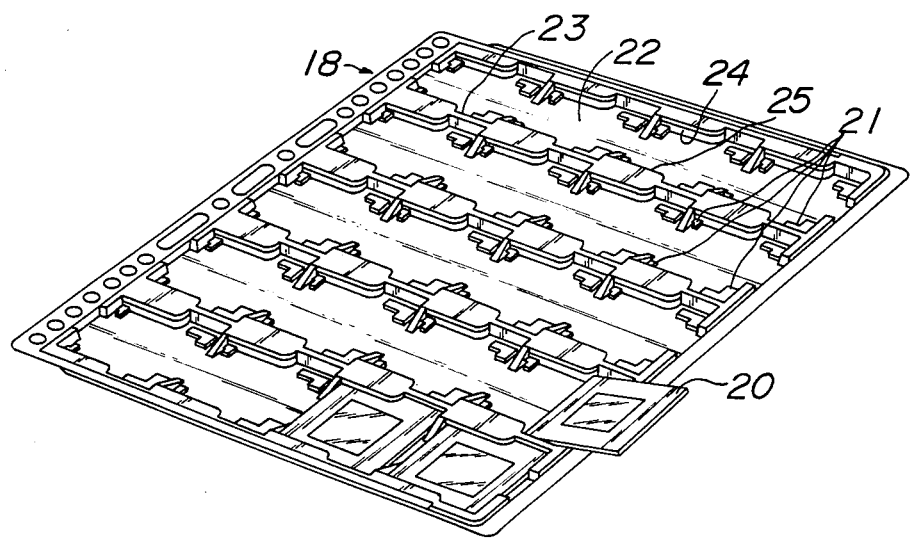
FIG. 3 is a schematic perspective view of a slide-filing sheet to be used in the present invention.
Figure 4:
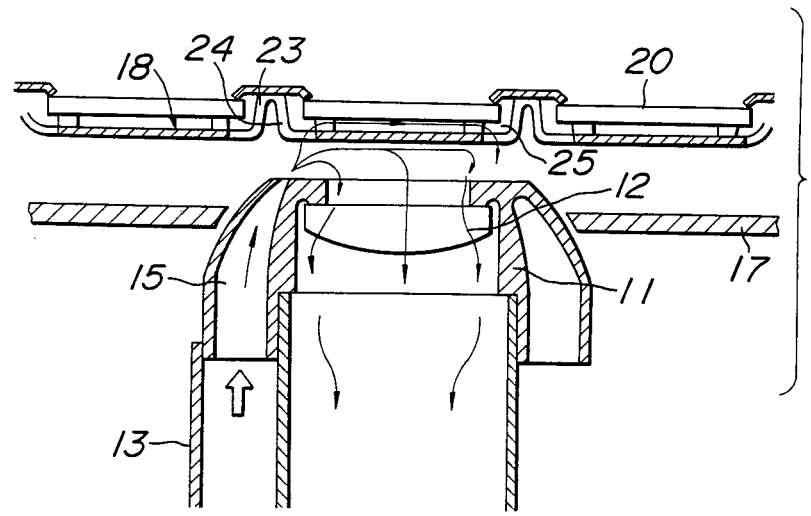
FIG. 4 is a diagrammatic illustration of the flow of cooling air in the preferred embodiment of the cooling device according to the present invention.

A typical slide-filing sheet 18 is shown in FIG. 3. The illustrated slide-filing sheet 18 is made of transparent or translucent material, and a plurality of rectangular sections or rectangular recesses are defined thereon so as to receive one transparency in each of such sections or recesses. The transparency 20 may or may not be mounted on a slide frame. Each section or recess of the slide-filing sheet 18 has spaced parallel seating portions 21 extending toward each other, a bottom wall 22, sidewalls 23, and a combination of an air inlet opening 24 and an air outlet opening 25 formed on the bottom wall 22 or the sidewalls 23. The illustrated embodiment has one air inlet opening 24 and one air outlet opening 25, but the numbers of such air inlet and outlet openings 24 and 25 can be increased so as to meet specific design conditions.

The operation of the cooling device of the invention will be described now. When the blowing fan 14 is driven, the air is forced to the first air-blowing nozzle 15 through the connecting tube 13, so as to be ejected therefrom in an obliquely upward direction. A part of the air thus ejected passes through the air inlet opening 24 and enters into a space between the transparency 20 and the bottom wall 22 of the slide-filing sheet 18, so as to cool the lower surface of the transparency 20 and the upper surface of the bottom wall 22. Then, the air is discharged in an obliquely downward direction through the air outlet opening 25. The remaining portion of the air ejected from the first air-blowing nozzle 15 is sucked through the sucking holes 16 so as to cool the second condenser lens 12 carried by the lens-holder member 11, and further sucked into the inside of the lamp house 2. The above-mentioned remaining portion of the air from the nozzle 15 also comes in contact with the lower surface of the bottom wall 22 of the slide-filing sheet 18 for cooling the bottom wall 22. The air discharged from the air outlet opening 25 after cooling the transparency 20 joins with the above-mentioned remaining portion of the air from the nozzle 15, and enters into the inside of the lamp house 2 while cooling the second condenser lens 12 at the sucking holes 16. Accordingly, the transparency 20, the second condenser lens 12, and the inside space of the lens-holder member 11 are all cooled uniformly. It is needless to say that the sucking fan 10 is operated simultaneously with the blowing fan 14.

The inside of the lamp house 2 is cooled in a manner similar to that of the prior art except the following. As the sucked air cools the inner wall of the lamp house 2, the reflector 8, the filter 4, and the first condenser lens 5 in succession, the air is gradually warmed, and then the light-source lamp 6 and the light-source mirror 7 are cooled by the thus warmed air before the air is sucked into the sucking pipe 9. Since the air is somewhat warmed before reaching the light-source lamp 6, the risk of excessively cooling the light-source lamp 6 and the risk of hampering the active halogen regenerating cycle are completely eliminated.

Figure 5:
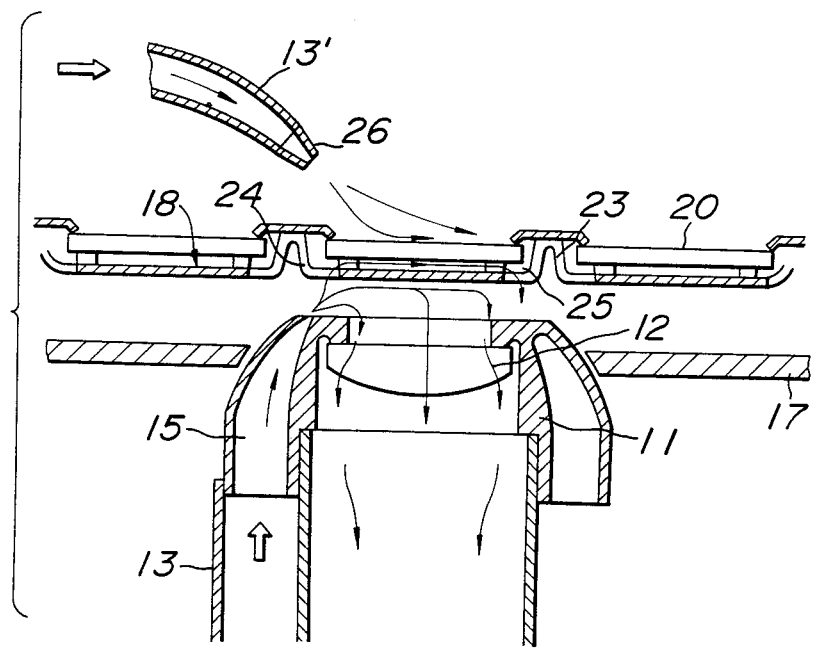
FIG. 5 is an illustration similar to FIG. 4, showing the flow of cooling air in another preferred embodiment of the present invention.

FIG. 5 shows another preferred embodiment of the cooling device according to the present invention. In this embodiment, another connecting tube 13', which is branched from the connecting tube 13 of the preceding embodiment, is connected to a second air-blowing nozzle 26 disposed above the regular position of the slide-filing sheet 18. Thus, the air is ejected in an obliquely downward direction from the second air-blowing nozzle 26 so as to come in direct contact with the upper surface of the transparency 20. Accordingly, in the embodiment of FIG. 5, both of the upper surface and the lower surface of the transparency 20 are simultaneously cooled, and the cooling effect of the transparency 20 is greatly enhanced.

It should be noted here that, although the first air-blowing nozzles 15 are integrally secured to the cylindrical lens-holder member 11 in the illustrated embodiment, it is also possible to separate the first air-blowing nozzles 15 from the cylindrical lens-holder member 11.

Figure 6:
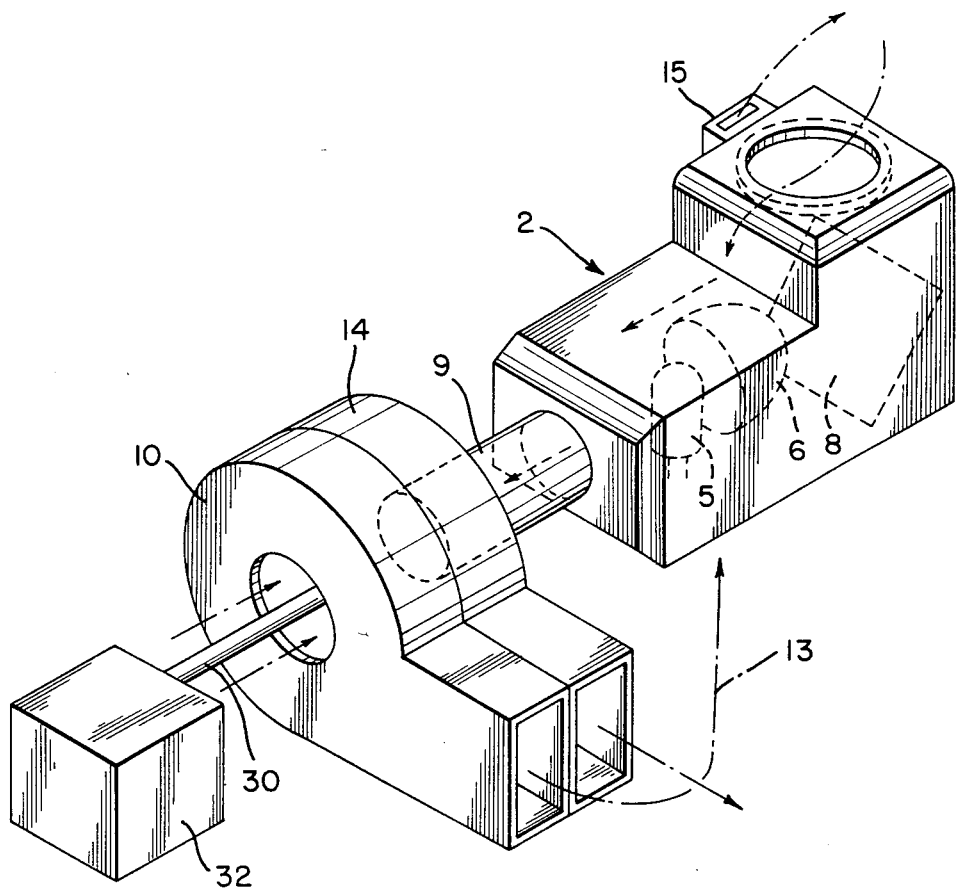
FIG. 6 is a perspective view of another preferred embodiment of the invention wherein the blowing and the suction fans are on a common driving shaft driven by a common motor.

As another modification of the illustrated embodiment as shown in FIG. 6, the sucking fan 10 and the blowing fan 14 can be connected to one common driving shaft 30 driven by one common motor 32 for reducing both the framework size of the slide projector and the weight thereof, so as to provide a compact overhead type slide projector. More particularly, a part of an air sucking passage and a part of an air blowing passage may be aligned while disposing a partition therebetween, so that a sucking fan 10 in the air sucking passage and a blowing fan 14 in the air blowing passage may be connected in series through the partition wall.

The cooling device of the present invention is not restricted to the illustrated embodiments, and numerous modifications thereof are possible without departing from the scope of the invention as hereinafter claimed. For instance, the horizontal cross section of the cylindrical lens-holder member 11 may not be rectangular but polygonal or circular, the air-blowing nozzle may have a slit-like elongated opening, a comparatively large number of the air-blowing nozzles may be used, and the light-source optical system may be disposed vertically instead of the illustrated horizontal disposition.

As described in detail in the foregoing, the cooling device according to the present invention can keep the temperature of the transparency about 10° C. lower than that attainable by the prior art, so that discolouring and bending of the transparency is substantially eliminated, and clearly defined pictures can be projected from the transparencies. When a halogen lamp is used as the light-source lamp, the heat generation at the light-source lamp is considerably reduced as compared with that from the regular incandescent lamp, and the temperature rise of the transparency can be further suppressed. The desired cooling effects can be achieved without increasing the overall size of the overhead type slide projector by mounting the sucking fan and the blowing fan on one common driving shaft.

It should be also noted that the cooling device of the present invention simultaneously cools the slide-filing sheet and the transparencies, so that the requirement for the material of the slide-filing sheet is reduced, at least with respect to the heat resistivity thereof, so that comparatively inexpensive material can be used for the slide-filing sheet. The cooling device of the present invention is used not only for slide-filing sheets carrying so-called mounted transparencies but also for slide-filing sheets carrying bare transparencies directly inserted therein.

Although the cooling device of the invention is particularly useful with slide-filing sheets in which spaces are formed between the transparencies and the bottom walls of the slide-filing sheets, the cooling device can be similarly used with those slide-filing sheets which have holes bored through central portions of the bottom walls of the individual rectangular sections or recesses thereof.

What is claimed is:

1. An overhead type transparency projector adapted to project pictures of transparencies carried in a transparency carrier, said projector comprising:
a framework with a base, a lamp house housing a light-source lamp and a first condenser lens spaced from the lamp, the lamp house having an open top end and a lower end thereof fixed to said base, a translucent diffusing plate mounted on an upper portion of said framework above said lamp house, a second condenser lens, and a lens-holder member for holding the periphery of said second condenser lens and fixed to an upper portion of the lamp house so as to extend upwards through said translucent diffusing plate, said lens holder member defining cooling passages between said member and said second condenser lens to permit cooling air to flow therethrough and into said lamp house;
supporting means for supporting a transparency above said second condenser lens; and
cooling means including a blowing fan, an air-blowing nozzle disposed below said transparency and adjacent to said lens-holder member and oriented obliquely relative to the axis of said second condenser lens and toward said transparency supporting means, a connecting tube extending between the discharge side of said blowing fan and said air-blowing nozzle, and a suction fan in communication with said lamp housing at a point on the opposite side of the light source from the side thereof on which the second condenser lens is positioned, whereby at least a part of the air from said air-blowing nozzle flows to a transparency being carried by said transparency supporting means to cool the transparency, and another part of the air therefrom passes through the passages in said lens-holder member and into said lamp house to cool the second condenser lens and the lamp house.

2. An overhead type transparency projector as set forth in claim 1, wherein said combination of the air inlet opening and the air outlet opening are bored through said bottom wall of said rectangular section.

3. An overhead type transparency projector as set forth in claim 1, wherein said combination of the air inlet opening and the air outlet opening are bored through sidewalls of said rectangular section.

4. An overhead type transparency projector as set forth in claim 1, wherein said cooling means further comprises a second air-blowing nozzle disposed above the top surface of a transparency which is at a position immediately above said lens-holder member and facing the transparency.

5. An overhead type transparency projector adapted to project pictures of transparencies carried in a transparency carrier, said projector comprising:
a framework with a base, a lamp house housing a light-source lamp and a first condenser lens spaced from the lamp, the lamp house having an open top end and a lower end thereof fixed to said base, a translucent diffusing plate mounted on an upper portion of said framework above said lamp house, a second condenser lens, and a lens-holder member for holding the periphery of said second condenser lens and fixed to an upper portion of the lamp house so as to extend upwards through said translucent diffusing plate, said lens holder member defining cooling passages between said member and said second condenser lens to permit cooling air to flow therethrough and into said lamp house;
supporting means for supporting a transparency above said second condenser lens; and
cooling means including a blowing fan, a first air-blowing nozzle integral with said lens-holder member and oriented obliquely relative to the axis of said second condenser lens and toward said transparency supporting means a connecting tube extending between the discharge side of said blowing fan and said air-blowing nozzle, and a suction fan in communication with said lamp housing at a point on the opposite side of the light source from the side thereof on which the second condenser lens is positioned, whereby at least a part of the air from said air-blowing nozzle flows to a transparency being carried by said transparency supporting means to cool the transparency, and another part of the air therefrom passes through the passages in said lens-holder member and into said lamp house to cool the second condenser lens and the lamp house.

6. An overhead type transparency projector as set forth in claim 1, wherein said blowing fan and said suction fan are connected to one common driving shaft.

7. An overhead type transparency projector as set forth in claim 1, wherein said transparency carrier is adapted to be held by said framework above said translucent diffusing plate in parallel thereto and includes a plurality of rectangular sections defined therein for removably carrying and supporting transparencies within said rectangular sections, each of said rectangular sections having a bottom wall, at least one pair of spaced seats projecting above the bottom wall for receiving the transparency thereon, and a combination of an air inlet opening and an air outlet opening, said inlet and outlet openings providing communication between spaces on opposite sides of said bottom wall from a transparency.

8. An overhead type transparency projector as set forth in claim 5, wherein said lens-holder member includes a second integral air-blowing nozzle positioned on the opposite side of said holder member from said first air-blowing nozzle.

* * * * *